(12) United States Patent
Shiota et al.

(10) Patent No.: US 6,232,014 B1
(45) Date of Patent: May 15, 2001

(54) LITHIUM ION SECONDARY BATTERY AND MANUFACTURE THEREOF

(75) Inventors: Hisashi Shiota; Shigeru Aihara; Daigo Takemura; Jun Aragane; Hiroaki Urushibata; Kouji Hamano; Yasuhiro Yoshida; Takayuki Inuzuka; Michio Murai, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/341,665
(22) PCT Filed: Nov. 19, 1997
(86) PCT No.: PCT/JP97/04200
§ 371 Date: Jul. 19, 1999
§ 102(e) Date: Jul. 19, 1999
(87) PCT Pub. No.: WO99/26307
PCT Pub. Date: May 27, 1999

(51) Int. Cl.[7] .............................. H01M 2/02; H01M 2/24; H01M 2/26
(52) U.S. Cl. .................. 429/164; 429/137; 429/145; 429/249; 429/250; 429/94
(58) Field of Search .................. 429/164, 137, 429/144, 145, 249, 250, 94

(56) References Cited

U.S. PATENT DOCUMENTS

| | | |
|---|---|---|
| 3,734,778 * | 5/1973 | Huf et al. . |
| 4,064,725 * | 12/1977 | Hug et al. . |
| 4,565,751 * | 1/1986 | Faust et al. . |
| 5,180,647 * | 1/1993 | Rowland et al. . |
| 5,453,333 * | 9/1995 | Takauchi et al. . |
| 5,478,668 * | 12/1995 | Gozdz et al. . |
| 5,605,549 * | 2/1997 | Zucker . |
| 5,691,047 * | 11/1997 | Kurauchi et al. . |
| 5,830,603 * | 11/1998 | Oka et al. . |
| 5,981,107 * | 11/1999 | Hamano et al. . |
| 6,024,773 * | 2/2000 | Inzuka et al. . |
| 6,051,342 * | 4/2000 | Hamano et al. . |
| 6,051,343 * | 4/2000 | Suzuki et al. . |
| 6,124,061 * | 9/2000 | Hamano et al. . |

* cited by examiner

*Primary Examiner*—Patrick Ryan
*Assistant Examiner*—Jonathan Johnson
(74) *Attorney, Agent, or Firm*—Oblon, Spivak, McClelland, Maier & Neustadt, P.C.

(57) ABSTRACT

A practical lithium ion secondary battery. The battery is light in weight and is safe without using a firm battery case. It also has reduced internal resistivity. The battery includes a tabular roll-type laminated electrode body in which a band-formed positive electrode alternates with a band-formed negative electrode, with a band-formed rolled separator being placed therebetween. The positive electrode includes a positive electrode active material layer and a positive electrode current collector. The negative electrode includes a negative electrode active material layer and a negative electrode current collector. The separator holds a lithium ion-containing electrolytic solution. The positive electrode or the negative electrode is adhered with two separators by an adhesive layer.

16 Claims, 5 Drawing Sheets

LITHIUM ION SECONDARY BATTERY AND MANUFACTURE THEREOF

BACKGROUND OF THE INVENTION

1. Field of the Invention

This invention relates to a lithium ion secondary battery comprising a positive electrode and a negative electrode facing each other via a separator holding an electrolytic solution. More particularly, it relates to a battery structure providing improved electrical connections between each of a positive electrode and a negative electrode and a separator so that a battery may have an arbitrary shape, such as a thin shape.

2. Discussion of the Background

There has been an eager demand for reduction in size and weight of portable electronic equipment, and the realization relies heavily on improvement of battery performance. To meet the demand, development and improvement of batteries from various aspects have been proceeding. Battery characteristics expected to be improved include increases in voltage, energy density, resistance to high load, freedom of shape, and safety. Of available batteries, lithium ion batteries are the most promising secondary batteries for realizing a high voltage, a high energy density, and resistance to high load and have been and will be given improvements.

A lithium ion secondary battery mainly comprises a positive electrode, a negative electrode, and an ion-conducting layer interposed between the electrodes. The lithium ion secondary batteries that have been put to practical use employ a positive electrode plate prepared by applying to an aluminum current collector a mixture comprising a powdered active material, such as a lithium-cobalt complex oxide, a powdered electron conductor, and a binder resin; a negative electrode plate prepared by applying to a copper current collector a mixture of a powdered carbonaceous active material and a binder resin; and an ion conducting layer made of a porous film of polyethylene, polypropylene, etc. filled with a nonaqueous solvent containing lithium ions.

FIG. 5 schematically illustrates a cross section showing the structure of a conventional cylindrical lithium ion secondary battery disclosed in JP-A-8-83608. In FIG. 5 reference numeral 1 indicates a battery case made of stainless steel, etc. which also serves as a negative electrode terminal, and numeral 2 an electrode body put into the battery case 1. The electrode body 2 is composed of a positive electrode 3, a separator 4, and a negative electrode 5 in a rolled-up form. In order for the electrode body 2 to maintain electrical connections among the positive electrode 3, the separator 4, and the negative electrode 5, it is necessary to apply pressure thereto from outside. For this purpose, the electrode body 2 is put into a firm metal-made case to maintain all the planar contacts. In the case of rectangular batteries, an external pressing force is imposed to a bundle of strip electrodes by, for example, putting the bundle in a rectangular metal case.

That is, a contact between a positive electrode and a negative electrode in commercially available lithium ion secondary batteries has been made by using a firm case made of metal, etc. Without such a case, the electrodes would be separated, and the battery characteristics would be deteriorated due to difficulty in maintaining electrical connection between electrodes via an ion-conducting layer (separator). However, occupying a large proportion in the total weight and volume of a battery, the case causes reduction in energy density of the battery, Moreover, being rigid, it imposes limitation on battery shape, making it difficult to make a battery of arbitrary shape.

Under such circumstances, development of lithium ion secondary batteries which do not require a case has been proceeding, aiming at reductions in weight and thickness. The key to development of batteries requiring no case is how to maintain an electrical connection between each of a positive electrode and a negative electrode and an ion conducting layer (i.e., separator) interposed therebetween without adding an outer force. A method comprising bringing electrodes and a separator into intimate contact by means of a resin and the like has been proposed as a connecting means requiring no outer force.

For example, JP-A-5-159802 teaches a method in which an ion conducting solid electrolyte layer, a positive electrode, and a negative electrode are heat-bonded into an integral body by use of a thermoplastic resin binder. According to this technique, electrodes are brought into intimate contact by uniting the electrodes and an electrolyte layer into an integral body so that the electrical connection between electrodes is maintained to perform the function as a battery without applying outer force.

Being thus constituted, conventional lithium ion secondary batteries have their several problems. That is, those in which a firm case is used for ensuring intimate contacts between electrodes and a separator and electrical connections between electrodes have the problem that the case which does not participate in electricity generation occupies a large proportion in the total volume or weight of a battery, which is disadvantageous for production of batteries having a high energy density. Where the proposed method comprising bonding electrodes and an ion conductor with an adhesive resin is followed, for example, where a solid electrolyte and electrodes are merely brought into contact by an adhesive resin, the resistance to ion conduction within a battery increases due to the great resistance of the adhesive resin layer, resulting in reduction of battery characteristics.

Further, the battery according to JP-A-5-159802 supra, in which electrodes and a solid electrolyte are bonded with a binder, is disadvantageous in terms of ion conductivity as compared with, for example, batteries using a liquid electrolyte because the interface between an electrode and an electrolyte is covered with the binder. Even though an ion-conducting binder is employed, there is no binder generally known to be equal or superior in ion conductivity to a liquid electrolyte, and it has been difficult to achieve battery performance equal to that of a battery using a liquid electrolyte.

That is, a metal case is necessary for holding a liquid electrolyte in the electrode-electrolyte interface, which is disadvantageous for energy density. On the other hand, batteries of electrode-electrolyte bound type do not require a metallic case but have reduced conductivity through the electrode-electrolyte interface as compared with batteries using a liquid electrolyte, which is disadvantageous in terms of battery performance such as charge and discharge characteristics at a high load.

A nonaqueous electrolyte which can generally be used in lithium ion batteries has one-tenth or less as much conductivity as an aqueous electrolyte. Therefore, it is necessary to increase the battery area to reduce the internal resistivity. In order to make large-area electrodes into a compact battery, the electrodes are cut into strips which are laid one on top of another or the electrodes are inserted in rolled or folded band-formed separators. In practical battery assembly, a battery body is usually constructed by rolling up bands of separators and electrodes. It is possible to apply this assembly to the type of batteries in which electrodes are joined to a separator via an adhesive layer. However, the speed of rolling up the bands while applying an adhesive is lower than the speed of rolling using no adhesive, resulting in poor productivity of assembly. In a case where a battery body rolled up with no adhesive is fastened with a tape band, the internal resistivity is high because of insufficient contact at the electrode-separator interface. This is problematical in practical use particularly where a large electrical current is needed.

SUMMARY OF THE INVENTION

In order to solve these problems, the inventors of the present invention have conducted extensive study on a favorable method for laminating separators and electrodes. The present invention has been reached as a result. Accordingly, an object of the present invention is to provide a practical lithium ion secondary battery having low internal resistivity, in which a separator and an electrode are brought into intimate contact without using a firm battery case.

A first lithium ion secondary battery according to the present invention comprises a tabular roll type laminated battery body having a band-formed positive electrode comprising a positive electrode active material layer-and a positive electrode current collector, a band-formed negative electrode comprising a negative electrode active material layer and a negative electrode current collector, and band-formed separators which hold a lithium ion-containing electrolytic solution, wherein the positive electrode and the negative electrode alternate with a rolled separator therebetween, either one of the positive electrode and the negative electrode and the separators being adhered to each other by an adhesive layer. According to this structure, either one of a positive electrode and a negative electrode to which separators have been adhered is rolled up together with the other electrode to prepare a tabular roll type laminated battery body. The time required for the adhesive to dry can be shortened as compared with a case where rolling and adhesion operations are carried out simultaneously. When compared with a case wherein a positive electrode, a negative electrode, and separators are rolled up with no adhesion, it is only two members that are rolled up together, i.e., one of electrodes that is previously bonded between separators and the other electrode. Therefore, the rolling operation can be carried out easily. Further, since an electrode and a separator hardly slip on each other while rolled, it is less likely that an internal shortage occurs due to a contact between a positive and a negative electrode, which leads to improved safety. Furthermore, a lithium ion secondary battery having reduced internal resistivity can be obtained owing to the highly intimate contact between an electrode and separators.

A second lithium ion secondary battery of the invention is the above-described first lithium ion secondary battery, wherein the adhesive layer is a porous adhesive resin layer holding an electrolyte. According to this structure, the electrode and the separator are brought into intimate contact by the adhesive resin layer, and a liquid electrolytic solution is held in the through-holes of the adhesive resin layer which connect the electrode and the separator. As a result, satisfactory ion conduction through the electrode-electrolyte interface can be secured thereby to provide a lithium ion secondary battery which can have an increased energy density and a reduced thickness, can take an arbitrary shape, and exhibits excellent charge and discharge characteristics.

A third lithium ion secondary battery of the invention is the above-described second lithium ion secondary battery, wherein the porosity of the porous adhesive resin layer is equal to or greater than that of the separator. In this case, the adhesive resin layer holding an electrolytic solution has a proper ion conduction resistivity.

A fourth lithium ion secondary battery of the invention is the above-described second lithium ion secondary battery, wherein the ion conduction resistivity of the adhesive resin layer holding an electrolytic solution is equal to or smaller than that of the separator holding an electrolytic solution. According to this aspect, deterioration in charge and discharge characteristics are prevented, and excellent charge and discharge characteristics can be maintained.

A fifth lithium ion secondary battery of the invention is the above-described second lithium ion secondary battery, wherein the adhesive resin layer comprises a fluorocarbon resin or a mixture mainly comprising a fluorocarbon resin.

A sixth lithium ion secondary battery of the invention is the above-described fifth lithium ion secondary battery, wherein the fluorocarbon resin is polyvinylidene fluoride.

A seventh lithium ion secondary battery of the invention is the above-described second lithium ion secondary battery, wherein the adhesive resin layer comprises polyvinyl alcohol or a mixture mainly comprising polyvinyl alcohol.

Where a fluorocarbon resin or a mixture mainly comprising the same or polyvinyl alcohol or a mixture mainly comprising the same is used as an adhesive resin layer, a lithium ion secondary battery having the above-mentioned excellent characteristics can be obtained.

A process for producing the first lithium ion secondary battery according to the present invention comprises the steps of adhering either one of a band-formed positive electrode having a positive electrode active material layer and a positive electrode current collector and a band-formed negative electrode having a negative electrode active material layer and a negative electrode current collector in between a pair of band-formed separators to prepare an electrode with separators and rolling the electrode with separators and the other electrode in such a manner that the positive electrode may alternate with the negative electrode, having the separator interposed therebetween. According to this process, either one of the positive electrode and the negative electrode to which separators have been adhered is rolled up together with the other electrode so that the time for drying the adhesive can be reduced as compared with a case where adhesion is conducted at the time of rolling. Further, as compared with a case where three of a positive electrode, a negative electrode, and a separator are rolled up altogether, the workability in rolling is improved because only two of the electrode with separators and the other electrode are rolled up. Lightness in weight and safety are secured with no aid of a firm battery case, and a practical lithium ion secondary battery having reduced internal resistivity can be obtained with good productivity.

DETAILED DESCRIPTION OF THE PREFERRED EMBODIMENTS

Figure 1:
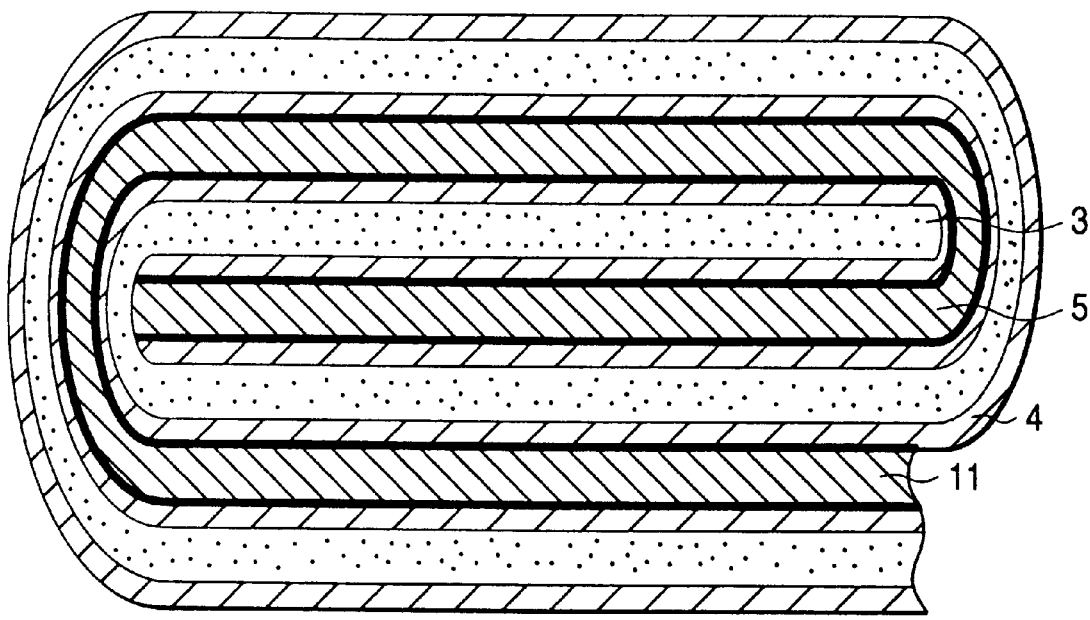
FIG. 1 is a schematic cross section showing the structure of the tabular roll type laminated electrode body of the lithium ion secondary battery according to an embodiment of the present invention.
Figure 2:
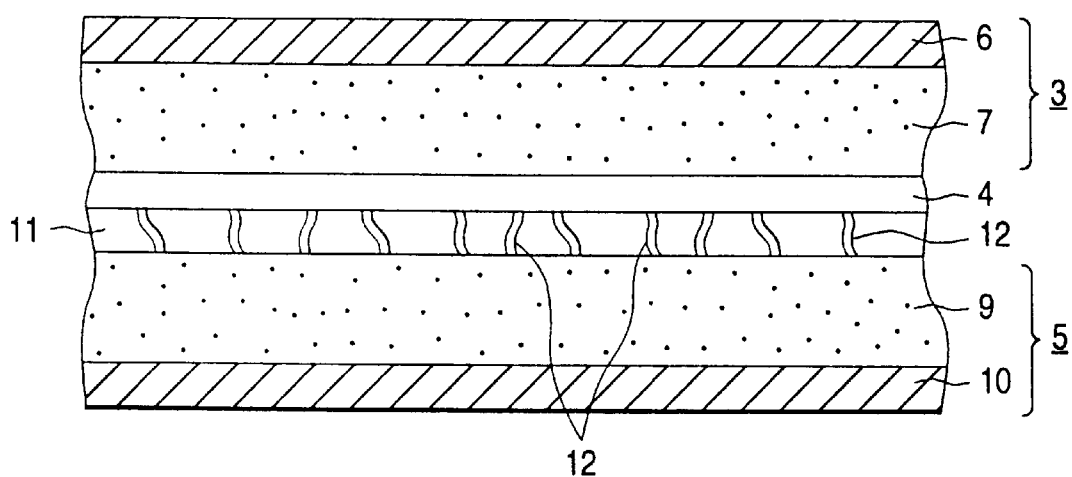
FIG. 2 is a schematic cross section illustrating the main part of the electrode body shown in FIG. 1.

FIG. 1 is a schematic cross section illustrating the constitution of the tabular roll type laminated electrode body of the lithium ion secondary battery according to an embodiment of the invention. FIG. 2 is an enlarged schematic cross section illustrating the main part of FIG. 1. The lithium ion secondary battery according to the invention has a tabular roll type laminate structure in which a positive electrode band and a negative electrode band alternately interposed between rolled separator bands, and either one of the positive electrode and the negative electrode is adhered to the separators with an adhesive layer. In these Figures, numeral 3 indicates a positive electrode made of a positive electrode active material layer 7 bonded to a positive electrode current collector 6; 5, a negative electrode made of a negative electrode active material layer 9 bonded to a negative electrode current collector 10; 4, a separator holding a lithium ion-containing electrolytic solution, interposed between the positive electrode 3 and the negative electrode 5; and 11, a porous adhesive resin layer which joins the negative electrode active material layer 9 and the separator 4. The adhesive resin layer 11 has a large number of through-holes 12 which connect the negative electrode active material layer 9 to the separator 4. The electrolytic solution is held in the through-holes.

The battery has a tabular roll type laminate structure in which the positive electrode band 3 and the negative electrode band 4 alternate with the rolled separator 4 therebetween, and either one of the positive electrode 3 and the negative electrode 5 and the separators 4 are adhered with the adhesive layer 11. Therefore, the tabular roll type laminated battery body can be formed by rolling up either one of the positive electrode 3 and the negative electrode 5 having the separator 4 adhered on each side thereof together with the other electrode, i.e., the negative electrode 5 or the positive electrode 3. The time required for drying the adhesive can be reduced as compared with a case in which adhesion is carried out simultaneously with rolling. When compared with a case in which a positive electrode, a negative electrode and a separator are rolled up together with no adhesion, it is only the two of the electrode with separators and the other electrode that should be rolled up. Therefore, the workability is good, and the apparatus for rolling can be simplified greatly. Since the electrodes and the separator hardly slip on each other while rolled, it is less likely that an internal shortage occurs due to a contact between the positive electrode and the negative electrode, leading to improved safety. A lithium ion secondary battery having reduced internal resistivity can be obtained owing to the highly intimate contact between the electrode and the separator.

Because the electrode layer (i.e., the active material layer 7 or 9) and the separator 4 serving as an electrolyte layer are joined by the porous adhesive resin layer 11, the adhesive strength between the electrode and the separator is guaranteed. An electrolytic solution being held in the through-holes 12 that are made through the adhesive resin layer 11 to connect the interface with the electrode and the interface with the separator, satisfactory ion conduction is secured through the electrode-electrolyte interface. Reduction in ion conduction resistance between electrodes also results. It is thus made possible to establish substantial equality to conventional lithium ion batteries having an outer case in terms of the quantity of ions moving in and out of the active material of the electrodes and the rate and quantity of migration of ions to the facing electrode.

The ending part of the separator that is the outermost layer can be adhered to the rolled electrode body after the final turn of rolling so as to maintain electrical connections between electrodes without applying outer force. This excludes the necessity of a firm battery case for retention of the battery structure and makes it feasible to reduce the weight and thickness of a battery and to design a battery shape freely. Further, excellent charge and discharge characteristics and battery performance as obtained from batteries using an electrolytic solution can be obtained.

Where the ion conduction resistivity of the adhesive resin layer 11 holding an electrolytic solution is equal to or smaller than that of the separator 4 holding an electrolytic solution, the adhesive resin layer 11 would not cause deterioration in charge and discharge characteristics, and it is possible to obtain charge and discharge characteristics on the same level of conventional batteries.

The ion conduction resistivity of the adhesive resin layer 11 can be controlled chiefly by varying its porosity and thickness. The porosity can be adjusted by selecting the ratio of the adhesive resin to, for example, N-methylpyrrolidone in the adhesive resin solution forming the adhesive resin layer. The porosity is preferably equal to or greater than that of the separator 4.

The adhesive resins which can be used for joining an active material layer and a separator include those which neither dissolve in the electrolytic solution nor undergo electrochemical reaction inside a battery and are capable of forming a porous film, such as a fluorocarbon resin or a mixture mainly comprising a fluorocarbon resin and polyvinyl alcohol or a mixture mainly comprising polyvinyl alcohol. Specific examples of useful resins include polymers or copolymers containing a fluorine atom in the molecular structure thereof, e.g., vinylidene fluoride or tetrafluoroethylene, polymers or copolymers having vinyl alcohol in the molecular skeleton thereof, and their mixtures with polymethyl methacrylate, polystyrene, polyethylene, polypropylene, polyvinylidene chloride, polyvinyl chloride, polyacrylonitrile or polyethylene oxide. Polyvinylidene fluoride, which is a fluorocarbon resin, is particularly suitable.

The lithium ion secondary battery having the above-mentioned constitution can be produced by applying an adhesive to a side each of a pair of separators 4, inserting a band-formed positive electrode 3 (or negative electrode) between the adhesive-coated sides of the paired separators 4, and rolling the resulting electrode with separators and the other electrode, i.e., a negative electrode 5 (or positive electrode), into an oblong ellipsoid so that the positive electrode 3 and the negative electrode 5 may alternate with the separator 4 therebetween.

The active materials which can be used in the positive electrode include complex oxides of lithium and a transition metal, such as cobalt, nickel or manganese; chalcogen compounds containing lithium; or complex compounds thereof; and these complex oxides, Li-containing chalcogen compounds or complex compounds thereof that contain various dopant elements. While any substance capable of intercalating and disintercalating lithium ions, which take the main part of a battery operation, can be used as a negative electrode active material, preferred active materials for use in the negative electrode include carbonaceous compounds, such as graphitizing carbon, non-graphitizing carbon, polyacene, and polyacetylene; and aromatic hydrocarbon compounds having an acene structure, such as pyrene and perylene. These active materials areusedin a particulate state. Particles having a particle size of 0.3 to 20 µm can be used. A preferred particle size is 0.3 to 5 µm.

Any binder resin that is insoluble in an electrolytic solution and undergoes no electrochemical reaction in the electrode laminate can be used for binding an active material into an electrode plate. Examples of useful binder resins are homo- or copolymers of vinylidene fluoride, ethylene fluoride, acrylonitrile, and ethylene oxide, and ethylene propylenediamine rubber.

Any metal stable within a battery can be used as a current collector. Aluminum is preferred for a positive electrode, and copper is preferred for a negative electrode. The current collector can be foil, net, expanded metal, etc. Those presenting a large void area, such as net and expanded metal, are preferred from the standpoint of ease of holding an electrolytic solution after adhesion.

Similarly to the adhesive resin used for adhesion of an electrode and a separator, adhesive resins which can be used for adhesion between a current collector and an electrode include those which neither dissolve in an electrolytic solution nor undergo electrochemical reaction inside a battery and are capable of forming a porous film. Examples include polymers having a fluorine molecule, e.g., vinylidene fluoride or tetrafluoroethylene, in the molecular structure thereof or mixtures thereof with polymethyl methacrylate, polystyrene, polyethylene, polypropylene, etc.; polymers or copolymers having vinyl alcohol in the molecular skeleton thereof or mixtures thereof with polymethyl methacrylate, polystyrene, polyethylene, polypropylene, polyvinylidene chloride, polyvinyl chloride, polyacrylonitrile, polyethylene oxide, etc. Polyvinylidene fluoride or polyvinyl alcohol is particularly suitable.

Any electron-insulating separator that has sufficient strength, such as porous film, net, and nonwoven fabric, can be used. While not limiting, polyethylene or polypropylene is a preferred material for the separator for their adhesiveness and safety.

The solvent and the electrolyte which make an electrolytic solution serving as an ion conductor can be any of nonaqueous solvents and any of lithium-containing electrolyte salts that have been employed in conventional batteries. Examples of useful solvents include ethers, such as dimethoxyethane, diethoxyethane, diethyl ether, and dimethyl ether; esters, such as propylene carbonate, ethylene carbonate, diethyl carbonate, and dimethyl carbonate; and mixed solvents consisting of two members selected from the ether solvents or the ester solvents or mixed solvents consisting of one member selected from the former group and one member selected from the latter group. Examples of useful electrolytes are $LiPF_6$, $LiAsF_6$, $LiClO_4$, $LiBF_4$, $LiCF_3SO_3$, $LiN(CF_3SO_2)_2$, $LiN(C_2F_5SO_2)_2$, and $LiC(CF_3SO_2)_3$.

Methods for applying the adhesive resin include coating with a bar coater, spraying with a spray gun, and dip coating.

The present invention will now be illustrated with reference to Examples, but the present invention is by no means limited thereto.

EXAMPLE 1

Preparation of Positive Electrode:

Eighty-seven parts by weight of $LiCoO_2$, 8 parts by weight of graphite powder, and 5 parts of polyvinylidene fluoride were dispersed in N-methylpyrrolidone to prepare positive electrode active material paste. The paste was applied to 20 µm thick band-formed aluminum foil as a positive electrode current collector with a doctor blade to a coating thickness of 150 µm to form an active material film. The coated aluminum foil was allowed to stand in a drier kept at 60° C. for 60 minutes to dry the paste. The resulting laminate was pressed to reduce the thickness of the positive electrode active material layer to 100 µm to prepare a band formed positive electrode 3 comprising the aluminum foil current collector 6 having formed thereon a 100 µm-thick positive electrode active material layer 7.

Preparation of Negative Electrode:

Ninety-five parts by weight of Mesophase Microbead Carbon (a trade name, produced by Osaka Gas Co., Ltd.) and 5 parts by weight of polyvinylidene fluoride were-dispersed in N-methylpyrrolidone (hereinafter abbreviated as NMP) to prepare negative electrode activematerial paste. The paste was applied to 20 µm-thick copper band-formed foil as a negative electrode current collector with a doctor blade to a thickness of 150 µm to form an active material film. The laminate was dried by allowing to stand in a drier at 60° C. for 60 minutes and pressed to reduce the thickness of the negative electrode active material layer to 100 µm to prepare a band-formed negative electrode 5 comprising the copper foil negative electrode current collector 10 having formed thereon a 100 µm-thick negative electrode active material layer 9.

Preparation of Adhesive Resin Solution:

Five parts by weight of polyvinylidene fluoride and 5 parts by weight of finely powdered alumina (Aerosil C, produced by Aerosil) were suspended and dissolved in N-methylpyrrolidone (hereinafter abbreviated as NMP), and the mixture was thoroughly stirred to prepare a viscous and uniform adhesive resin solution.

Preparation of Battery:

The adhesive resin solution thus prepared was uniformly applied to a side each of two porous polyethylene sheets (ME 9630, produced by Asahi Chemical Industry Co., Ltd.) of band form which serve as a pair of separators 4. Before the adhesive dried, the above-prepared band-formed negative electrode 5 (or positive electrode) was sandwiched and stuck in between the separators with their coated sides inward. The separators 4 used here were slightly wider and longer than the negative electrode 5 (or positive electrode). The resulting laminate, i.e., the negative electrode 5 (or positive electrode) having the separators 4 stuck on each side thereof, was put in a warm air drier at about 80° C. to evaporate NMP, whereby NMP escaped to leave throughholes 12 in the adhesive layer 11.

Then, the band-formed positive electrode 3 (or negative electrode) was put on the outer side of one of the separators 4 having the negative electrode 5 (or positive electrode) therebetween, with a prescribed length of the starting end of the positive electrode 3 sticking out over the end of that separator 4. The sticking end of the positive electrode 3 (or negative electrode) was folded to come into contact with the other separator 4. The separators 4 having the negative electrode 5 (or positive electrode) therebetween were rolled up in such a manner that the folded part of the positive electrode 3 (or negative electrode) might be wrapped in, making an oblong ellipsoid. After the final turn of rolling, the margin of the separators was fixed to the rolled electrode body with an adhesive to prepare a tabular roller type laminated electrode body.

The tabular roll type laminated electrode body, after thoroughly dried, was evacuated to 50 Torr and immersed in an electrolytic solution prepared by dissolving lithium hexafluorophosphate in a 1:1 (by mole) mixed solvent of ethylene carbonate and dimethyl carbonate in a concentration of 1.0 mol/dm$^3$. The impregnated electrode body was heat-sealed into an aluminum laminate film pack to complete a lithium ion secondary battery having a tabular laminated battery body.

Figure 3:
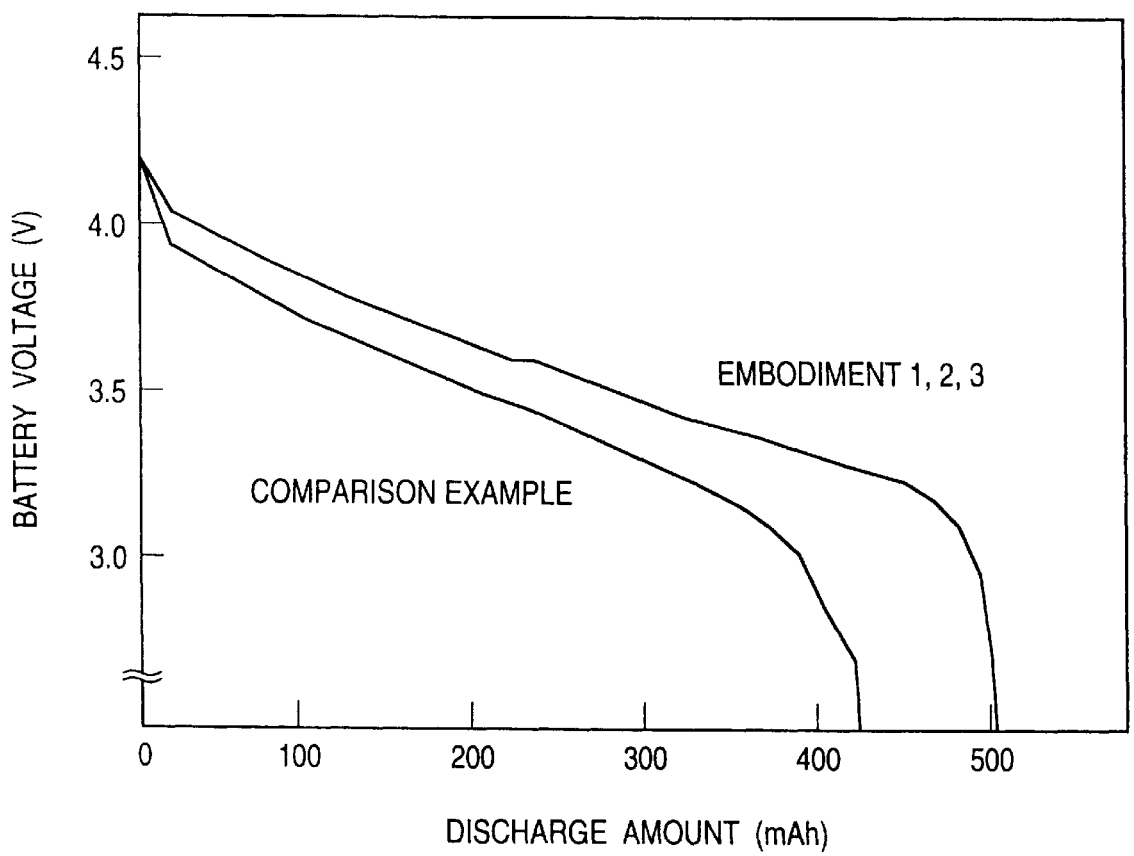
FIG. 3 is a characteristic diagram showing the discharge characteristics of the batteries obtained in Examples 1 to 3 and a comparative battery.

FIG. 3 shows a graph of discharge characteristics of the lithium ion secondary battery thus obtained in Example 1 in comparison with those of a comparative battery which was prepared by rolling up the same electrodes and separators as used in Example 1 but without using the adhesive, fastening the rolled electrode body with a tape band, impregnating the electrode body in the same electrolytic solution as used above, and sealing the electrode body into an aluminum laminate film pack. It is seen from the graph that the battery of Example 1 retains a sufficient capacity for discharging at a greater current because of its smaller internal resistivity.

Figure 4:
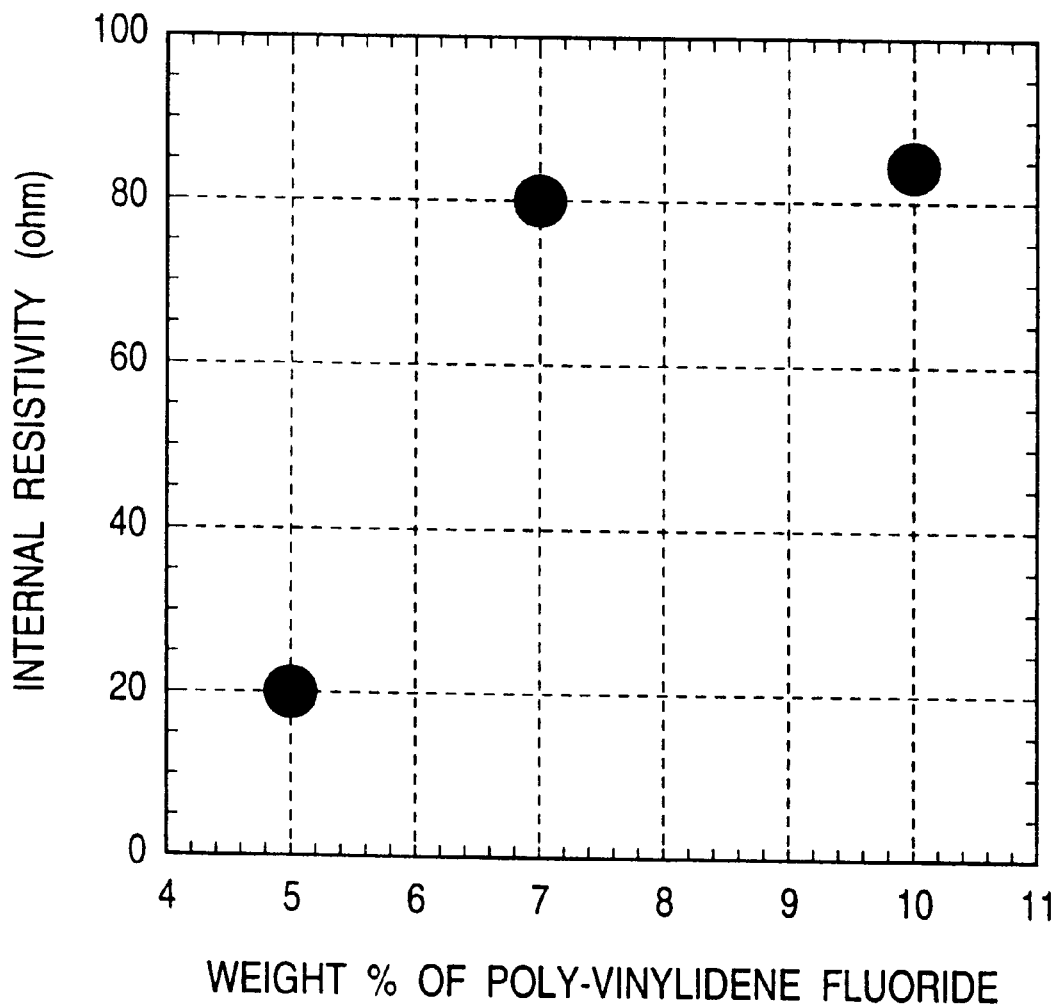
FIG. 4 is a characteristic plot of internal resistivity on amount of adhesive resin in the adhesive resin solution used in the formation of an adhesive resin layer according to an embodiment of the present invention.
Figure 5:
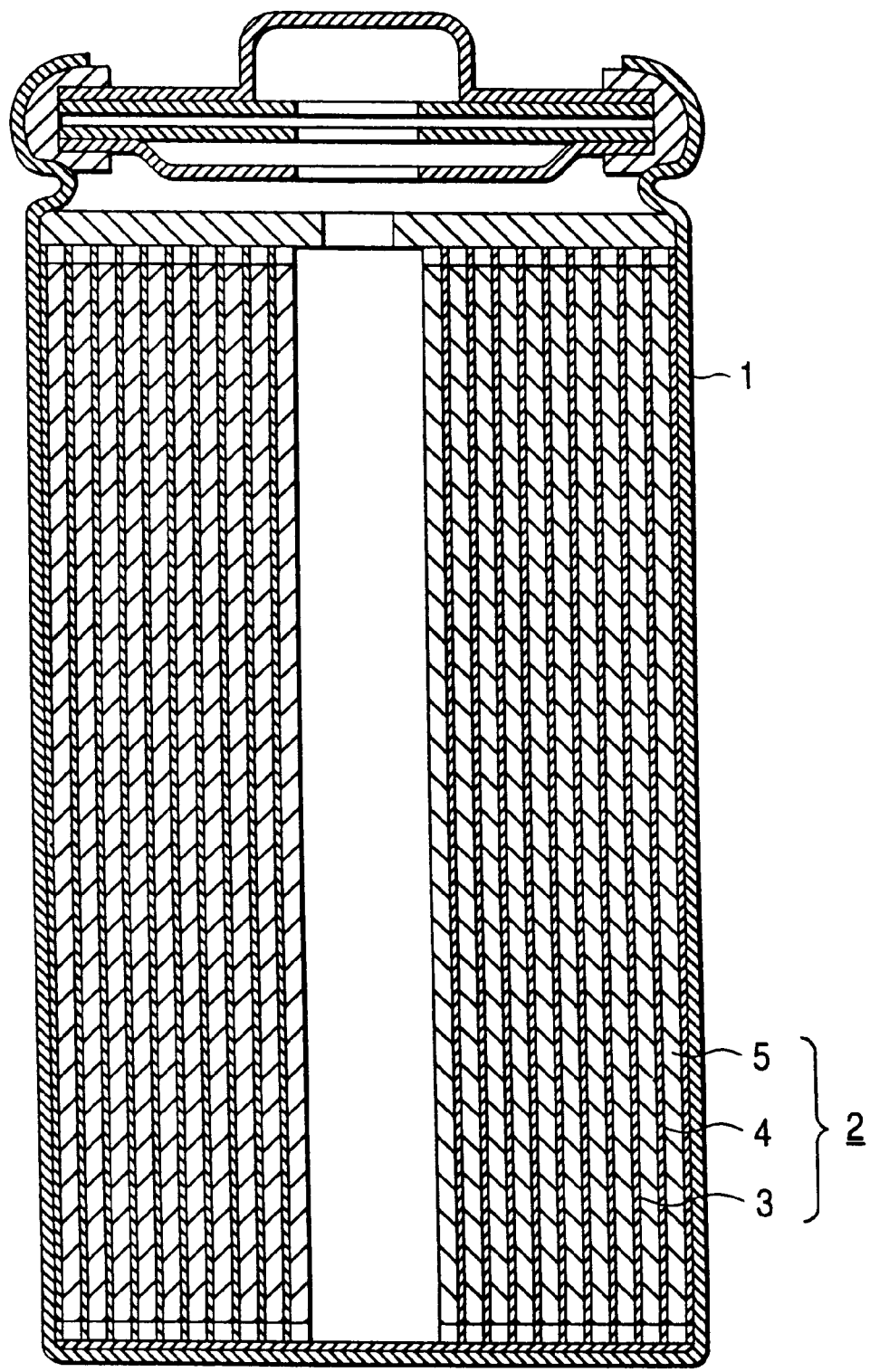
FIG. 5 is a schematic cross section of an example of conventional lithium ion secondary batteries.

The characteristic plot of FIG. 4 shows the internal resistivity of the battery with the amount of the adhesive resin in the adhesive resin solution being varied; 5 parts, 7 parts and 10 parts by weight per NMP. It is seen that the resistivity increases abruptly with an increase from 5 parts to 7 parts by weight. Seeing that the thickness of the adhesive resin layer 11 is proportional to the amount of the adhesive resin in the adhesive resin solution, it is considered that retention and distribution of the electrolytic solution in the adhesive resin layer 11 change abruptly in that range, resulting in a steep rise of resistivity. The resistivity at 5 parts by weight was almost equal to the resistivity as measured on a battery in which no adhesive resin layer 11 was provided but a sufficient planar pressure was applied to electrodes 3 and 5 and separators 4.

EXAMPLE 2

A battery having the tabular roll type laminated electrode body shown in FIG. 1 was prepared in the same manner as in Example 1, except for changing the adhesive resin solution used in Example 1.

Preparation of Adhesive Resin Solution:

A viscous adhesive resin solution was prepared by mixing N-methylpyrrolidone with polytetrafluoroethylene, a vinylidene fluoride-acrylonitrile copolymer, a mixture of polyvinylidene fluoride and polyacrylonitrile, a mixture of polyvinylidene fluoride and polyethylene oxide, a mixture of polyvinylidene fluoride and polyethylene terephthalate, a mixture of polyvinylidene fluoride and polymethyl methacrylate, a mixture of polyvinylidene fluoride and polystyrene, a mixture of polyvinylidene fluoride and polypropylene, or a mixture of polyvinylidene fluoride and polyethylene at the same mixing ratio.

A battery having a tabular roll type laminated electrode body was prepared by using each of the adhesive resin solutions in the same manner as in Example 1. Compared with the comparative battery, the resulting battery exhibited excellent discharging current vs. capacity characteristics as shown in FIG. 3.

EXAMPLE 3

A battery having the tabular roll type laminated electrode body shown in FIG. 1 was prepared in the same manner as in Example 1, except for changing the adhesive resin solution shown in Example 1.

Preparation of Adhesive Resin Solution:

A viscous adhesive resin solution was prepared from polyvinyl alcohol, a mixture of polyvinyl alcohol and polyvinylidene fluoride, a mixture of polyvinyl alcohol and polyacrylonitrile, or a mixture of polyvinyl alcohol and polyethylene oxide by mixing with or dissolving in NMP.

A battery having a tabular roll type laminated battery body was prepared by using each of these adhesive resin solutions in the same manner as in Example 1. Compared with the comparative battery, the resulting battery exhibited excellent discharging current vs. capacity characteristics as shown in FIG. 3.

While in the foregoing examples the adhesive resin solution was applied by a bar coating method, it may be applied with a spray gun.

While the foregoing examples have shown embodiments in which electrodes having an active material layer adhered to a current collector are used as a positive electrode 3 and a negative electrode 5, electrodes in which an active material layer itself functions as a current collector are also useful.

The present invention provides batteries which can have reduced size and weight and an arbitrary shape as well as improved performance and can be used in portable electronic equipment, such as portable personal computers and cellular phones.

What is claimed is:

1. A lithium ion secondary battery, comprising:
   a tabular roll type laminated battery body including:
     a band-formed positive electrode having a positive electrode active material layer and a positive electrode current collector;
     a band-formed negative electrode having a negative electrode active material layer and a negative electrode current collector; and
     band-formed separators, which hold a lithium ion-containing electrolytic solution,
     wherein the positive electrode and the negative electrode alternate with a rolled separator of the band-formed separators therebetween, and
     only a single one of the positive electrode and the negative electrode is adhered to a separator of the band-formed separators with an adhesive layer.

2. The lithium ion secondary battery according to claim 1, wherein the adhesive layer is a porous adhesive resin layer holding an electrolyte.

3. The lithium ion secondary battery according to claim 2, wherein the porosity of the porous adhesive resin layer is equal to or greater than that of the separators.

4. The lithium ion secondary battery according to claim 3, wherein the ion conduction resistivity of the adhesive resin layer holding an electrolytic solution is equal to or smaller than that of the separators holding an electrolytic solution.

5. The lithium ion secondary battery according to claim 2, wherein the adhesive resin layer comprises a fluorocarbon resin or a mixture mainly comprising a fluorocarbon resin.

6. The lithium ion secondary battery according to claim 5, wherein the fluorocarbon resin is polyvinylidene fluoride.

7. The lithium ion secondary battery according to claim 2, wherein the adhesive resin layer comprises polyvinyl alcohol or a mixture mainly comprising polyvinyl alcohol.

8. The lithium ion secondary battery according to claim 2, wherein the porous adhesive resin layer comprises through holes penetrating through an entire depth thereof.

9. A process for producing a lithium ion secondary battery, comprising the steps of:
   providing a tabular roll type laminated battery body including:

providing a band-formed positive electrode having a positive electrode active material layer and a positive electrode current collector;

providing a band-formed negative electrode having a negative electrode active material layer and a negative electrode current collector;

providing band-formed separators, which hold a lithium ion-containing electrolytic solution;

alternating the positive electrode and the negative electrode with a rolled separator of the band-formed separators therebetween; and adhering only a single one of the positive electrode and the negative electrode to a separator of the band-formed separators with an adhesive layer.

10. The process according to claim 9, wherein the adhering step comprises providing the adhesive layer as a porous adhesive resin layer holding an electrolyte.

11. The process according to claim 10, wherein the step of providing the adhesive layer comprises providing the porosity of the porous adhesive resin layer to be equal to or greater than that of the separators.

12. The process according to claim 11, wherein the step of providing the adhesive layer comprises providing ion conduction resistivity of the adhesive resin layer holding an electrolytic solution to be equal to or smaller than that of the separators holding an electrolytic solution.

13. The process according to claim 10, wherein the step of providing the adhesive layer comprises providing the adhesive resin layer as a fluorocarbon resin or a mixture mainly comprising a fluorocarbon resin.

14. The process according to claim 13, wherein the step of providing the adhesive layer comprises providing the fluorocarbon resin as polyvinylidene fluoride.

15. The process according to claim 10, wherein the step of providing the adhesive layer comprises providing the adhesive resin layer as polyvinyl alcohol or a mixture mainly comprising polyvinyl alcohol.

16. The process according to claim 10, wherein the step of providing the porous adhesive resin layer comprises providing the porous adhesive resin layer with through holes penetrating through an entire depth thereof.

* * * * *